United States Patent [19]

Kataoka

[11] Patent Number: 5,285,134

[45] Date of Patent: Feb. 8, 1994

[54] CONTROL DEVICE FOR VIBRATION TYPE MOTOR

[75] Inventor: Kenichi Kataoka, Yokohama, Japan

[73] Assignee: Canon Kabushiki Kaisha, Tokyo, Japan

[21] Appl. No.: 978,047

[22] Filed: Nov. 18, 1992

Related U.S. Application Data

[63] Continuation of Ser. No. 666,605, Mar. 8, 1991.

[30] Foreign Application Priority Data

Mar. 9, 1990 [JP]  Japan .................................. 2-058510

[51] Int. Cl.$^5$ .................................... H01L 41/08
[52] U.S. Cl. ...................................... 318/116; 310/316
[58] Field of Search ............... 310/323, 328, 316, 317; 318/116

[56] References Cited

U.S. PATENT DOCUMENTS

| | | | |
|---|---|---|---|
| 4,658,172 | 4/1987 | Izukawa | 310/316 |
| 4,723,129 | 2/1988 | Endo et al. | 346/1.1 |
| 4,740,796 | 4/1988 | Endo et al. | 346/1.1 |
| 4,926,084 | 5/1990 | Furutsu et al. | 310/316 |
| 4,954,742 | 9/1990 | Izukawa | 310/316 |
| 4,983,875 | 1/1991 | Masaki et al. | 310/323 |
| 4,990,835 | 2/1991 | Ohnishi et al. | 310/317 X |
| 5,001,404 | 3/1991 | Kataoka | 318/116 |
| 5,004,964 | 4/1991 | Kataoka et al. | 318/128 |
| 5,013,955 | 5/1991 | Hara et al. | 310/316 |

FOREIGN PATENT DOCUMENTS 64-60273  3/1989  Japan .

Primary Examiner—Mark O. Budd
Attorney, Agent, or Firm—Fitzpatrick, Cella, Harper & Scinto

[57] ABSTRACT

There is disclosed a control device for selectively driving plural vibration type motors with a single drive circuit. A matching element is provided for matching the characteristics of the drive circuit with those of the selected motor, thus improving the driving efficiency in the drive of different vibration type motors with the same drive circuit.

8 Claims, 8 Drawing Sheets

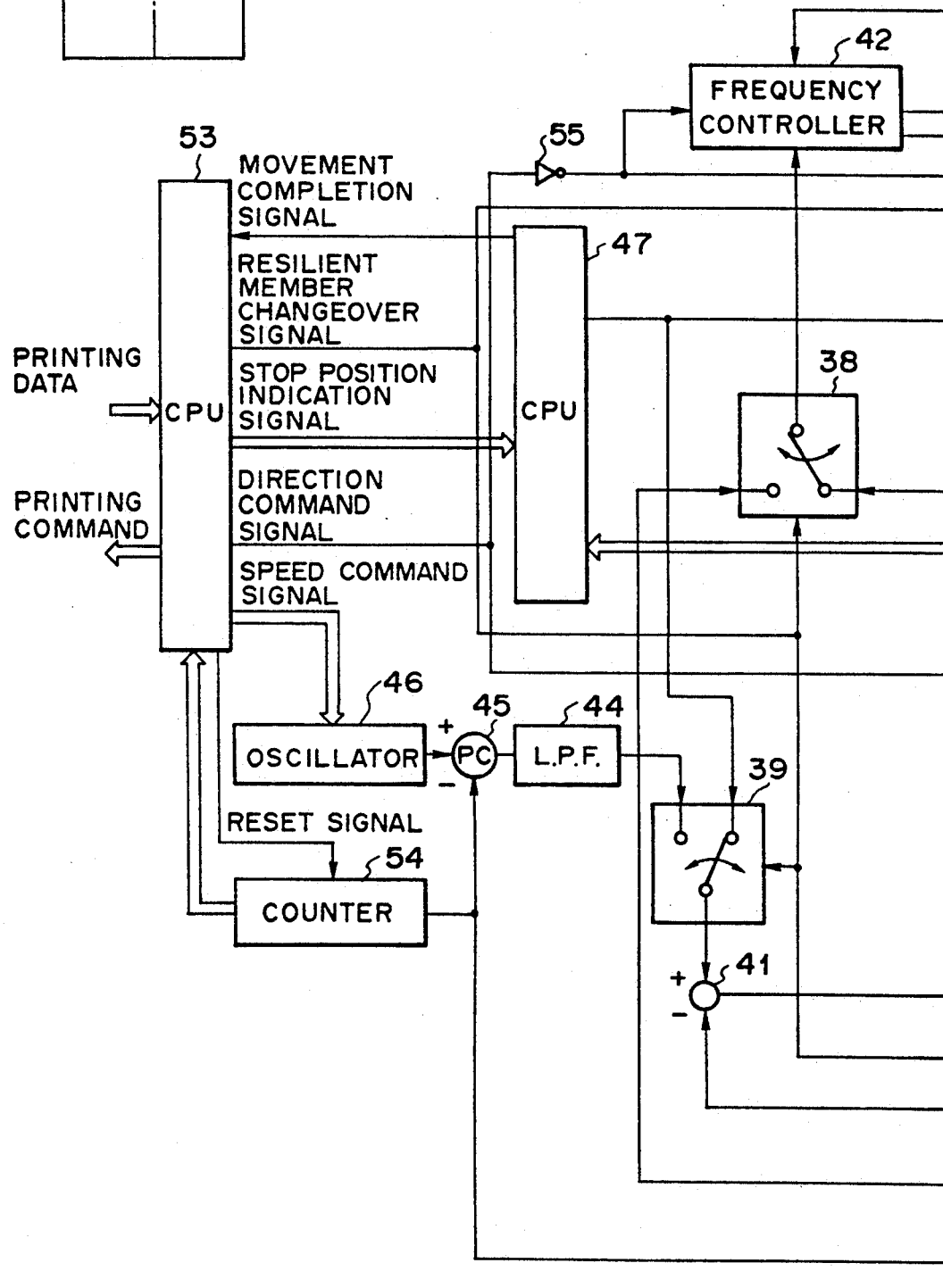

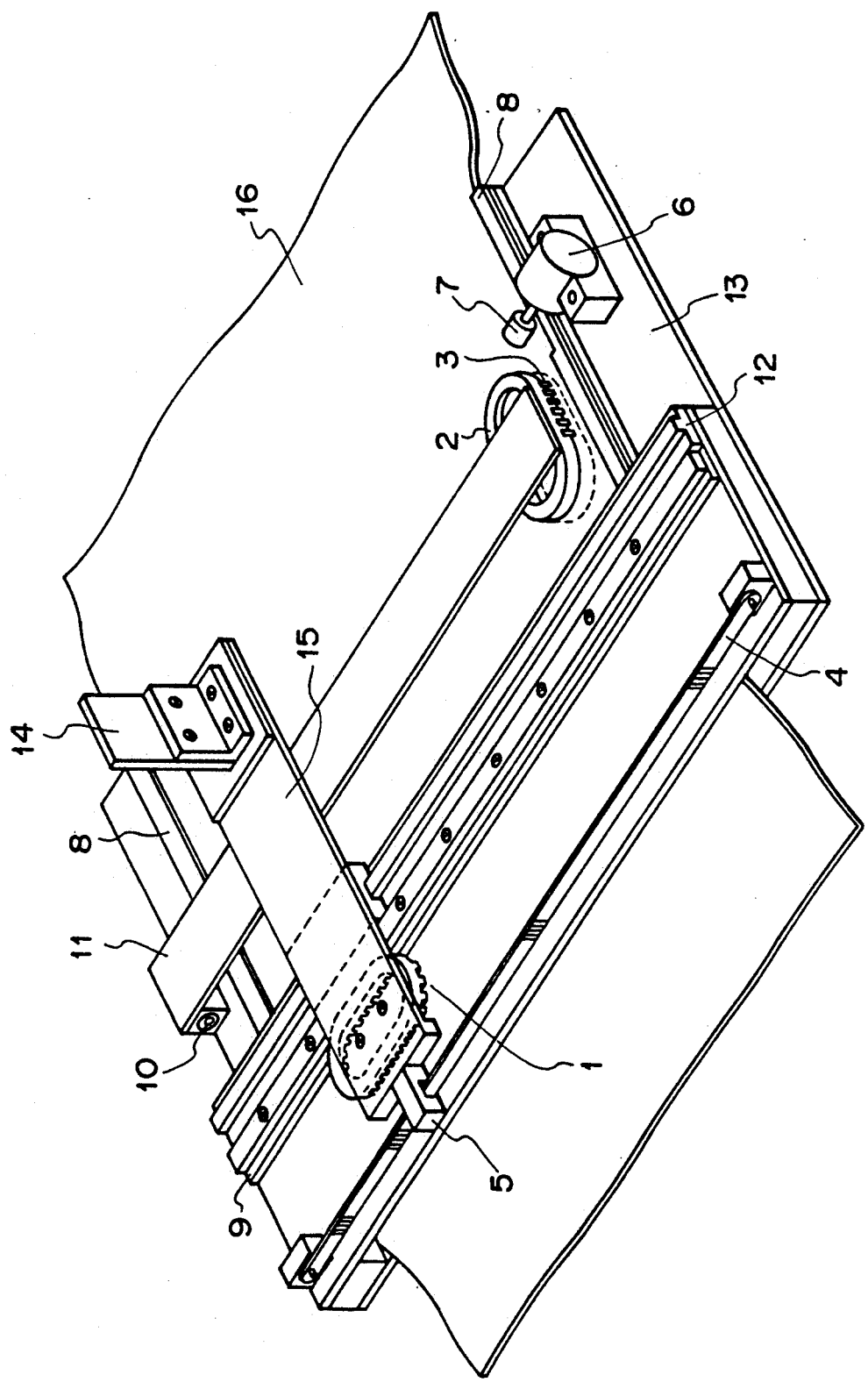

CONTROL DEVICE FOR VIBRATION TYPE MOTOR

This application is a continuation of application Ser. No. 07/666,605 filed Mar. 8, 1991.

BACKGROUND OF THE INVENTION

1. Field of the Invention

The present invention relates to a device for controlling a vibration type motor.

2. Related Background Art

A circuit for controlling plural vibration wave motors is already known for example by the Japanese Laid-open Patent Sho 64-60273. In such known devices a driving circuit is provided with switching means for switching the resonance frequency according to the one selected from plural vibration wave motors and switching the drive output according to the selected motor.

However, such conventional devices lack the control on the amplitude or phase of the vibration, on the control gain and on the output matching, and have been associated with drawbacks of low circuit efficiency or inability to achieve highly precise control.

SUMMARY OF THE INVENTION

An object of the present invention is to provide a vibration type motor device or system having a drive circuit commonly used for plural vibration type motors, wherein a matching element is provided for matching the characteristics of the drive circuit with those of the selected vibration type motor, thereby enabling efficient drive.

Another object of the present invention is to provide a vibration type motor device or system, under the foregoing object, having a matching impedance for matching the impedance of the output stage of the drive circuit with that of each motor.

Still another object of the present invention is to provide a system having a drive circuit commonly used for plural vibration type motors and capable of drive control by feedback of a detection signal, from means for detecting the vibration state of a selected motor, to the drive circuit, wherein a switching circuit is provided for switching the control gain for the detection signal according to the selected motor.

Still another object of the present invention is to provide a printer employing vibration type motors, in which a vibration type motor for sheet feeding and a vibration type motor for moving the printing head are controlled by the same drive circuit.

Still other objects of the present invention will become fully apparent from the following description of embodiments, to be taken in conjunction with the attached drawings.

BRIEF DESCRIPTION OF THE DRAWINGS

FIG. 2 is a perspective view of a printer in which the present invention can be effectively applied;

DESCRIPTION OF THE PREFERRED EMBODIMENTS

Figure 1B:
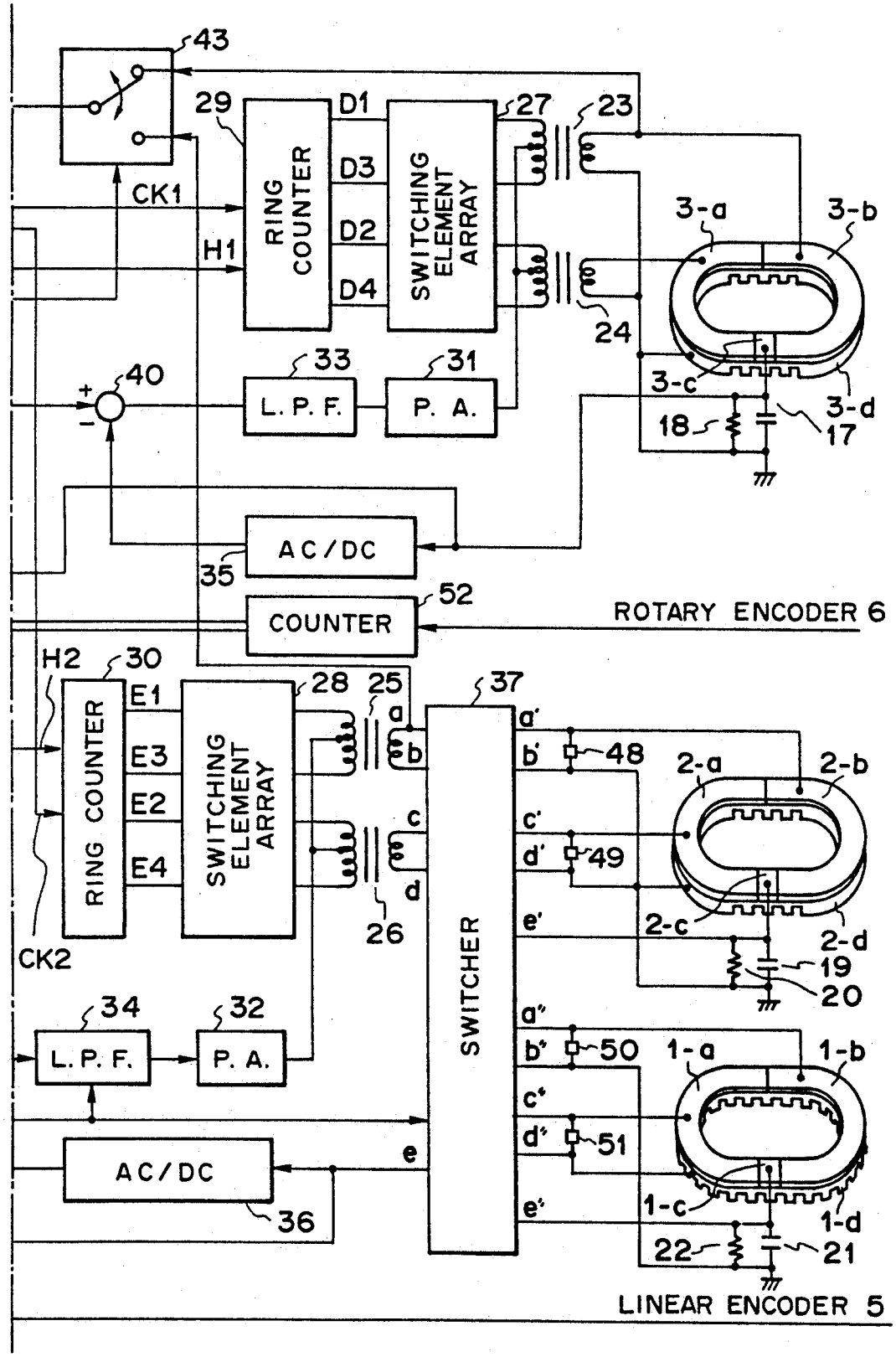
FIG. 1 is a composite of FIGS. 1A and 1B FIGS. 1A and 1B are block diagrams of an embodiment of the drive circuit for vibration type motors of the present invention.

FIG. 2 is a schematic perspective view of the driving unit of a printer of a bubble jet system employing three elastic members constituting motors to be driven by the device of the present invention, and FIG. 1 is a block diagram of the control circuit for the driving unit of the printer.

The printer of the bubble jet system is disclosed for example in U.S. Pat. Nos. 4,723,129 and 4,740,796, and generally includes printers of the type in which an electrothermal transducer positioned corresponding to a liquid path or a sheet containing liquid (ink) is given at least a drive signal corresponding to the recording information and inducing a rapid temperature increase exceeding nuclear boiling, whereby thermal energy is generated in the electrothermal transducer to induce thin film boiling on a heat acting surface of the recording head and eventually forming a bubble in the liquid (ink) in one-to-one correspondence to the drive signal and the liquid (ink) is discharged through a discharge opening to form at least a droplet by growth or shrinkage of the bubble whereby the droplet is deposited onto a sheet to form a print.

In the following there will at first be explained the structure and working principle of the printer, and then of the control circuit.

A running track-shaped elastic member 1 generates a travelling vibration wave along the track, by the application of at least two different electric fields (cyclic signals) to piezoelectric members (not shown) adhered to the upper face of the elastic member. A slider 9 is maintained in pressure contact with the lower face of one of the linear portions of the elastic member 1 and serves to generate a relative force by the friction resulting from elliptic movement of the surface of the elastic member 1 generated by the travelling vibration wave. A linear guide 12 serves to define the direction of the relative force along the slider. A carriage 15 for supporting the elastic member 1 is connected thereto, together with a pressurizing mechanism (not shown). A linear pulse plate 4 and a photointerruptor 5 constitute a linear encoder, used for the speed control of the elastic member 1. There also is shown a printing head 14.

Elastic members 2, 3 are positioned in mutually opposed manner, across a sheet 16, and are provided with slit structures on the mutually opposed faces piezoelectric elements (not shown) are adhered to the rear faces thereof. A support plate 11 supports the elastic member 2 at an end portion thereof. A bearing 10 is mounted on the other end of the support plate 11 and is fitted on guide rod (not shown) thereby guiding the support plate 11 along the guide rod and rotatably supporting the support plate 11 about the guide rod. Thus, the sheet 16 receives a pressure resulting from the weight of the elastic member 2 and the support plate 11. A rotary encoder 6 and a rubber roller 7 are provided for detecting the position of the sheet 16. There are further provided a bottom plate 13, and a sheet guide 8. In the following there will be briefly explained the sheet feeding mechanism composed of the elastic members 2, 3, with reference to FIG. 3.

The sheet 16 is pinched with an appropriate pressure by the elastic members 2, 3, in which flexural vibrations (travelling waves) are generated with a mutual spatial phase difference of 180°, whereby the flexural vibrations of the elastic members 2, 3 proceed in such a manner that the protruding portions thereof toward the sheet 16 always move in mutually opposed positions. Any mass point on the surface of the elastic member 2 or 3, for example at a protruding portion thereof, generally moves along an elliptic trajectory. For example, in FIG. 3, such mass point on the elastic member 2 moves clockwise along an eliptic trajectory when the travelling wave moves to right. Consequently the moving direction of such point of the protruding portion is opposite to the moving direction of the travelling wave, and the sheet 16 is moved by the movement of such points.

On the other hand, in the recessed portions, there is generated a sheet transporting force in a direction the same as the moving direction of the travelling wave, but such force is weaker because of the smaller friction between the sheet 16 and the elastic members 2, 3. Therefore, the sheet transporting force in total is in a direction opposite to the moving direction of the travelling wave.

In the following there will be explained the control circuit shown in FIG. 1, in which the three elastic members 1, 2, 3 constituting motors are driven by two drive circuits with appropriate switching. More specifically, a drive circuit is commonly used for the sheet feeding elastic member 2 and the head moving elastic member 1, by stopping the printing head while the sheet is driven and by stopping the sheet while the printing head is driven. Also in the present embodiment, simultaneously with the switching of the elastic members 1 and 2, there is switched the gain of an amplitude control loop according to the difference in the vibration characteristics of both elastic members and also according to the object of control (position control, speed control, highspeed response etc.). These functions will be explained in the following with reference to FIG. 1. The piezoelectric elements provided on the elastic members 1, 2, 3 constituting different motors have A-phase electrodes $1a$, $2a$, $3a$ and B-phase electrodes $1b$, $2b$, $3b$ for driving the piezoelectric elements, and S-phase electrodes $1c$, $2c$, $3c$ for detecting the amplitude of vibration.

On the elastic members 1, 2, 3 there are respectively attached capacitors 17, 19, 21 for dividing the voltages generated by the vibrations and detected by the S-phase electrodes, and resistors 18, 20, 22 for discharging the charges of low-frequency components generated on the S-phase electrodes.

Voltage-elevating transformers 23, 24 are exclusively used for voltage supply to the A- and B-phase electrodes $3a$, $3b$ for driving the elastic member 3, while voltage-elevating transformers 25, 26 are used for driving the elastic members 1 and 2, and the output voltages thereof are selectively supplied to the A- and B-phase electrodes $1a$, $1b$ of the elastic member 1 or those $2a$, $2b$ of the elastic member 2 by a switcher 37 to be explained later.

Figure 9:
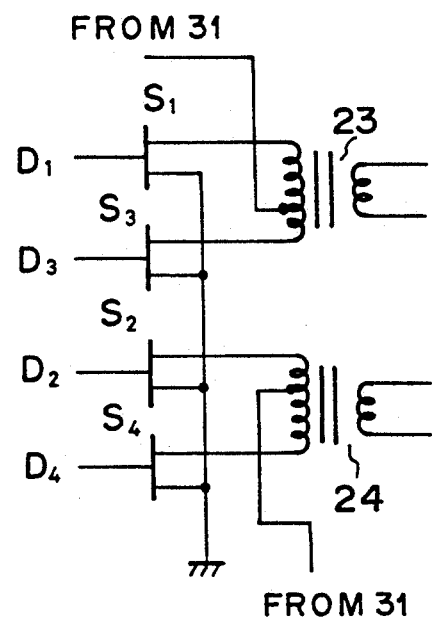
FIG. 9 is a circuit diagram of a switching element array 27.

Switching element arrays 27, 28, each consisting of four switching elements as shown in FIG. 9, are respectively connected to the transformers 23, 24 and the transformers 25, 26.

Figure 6:
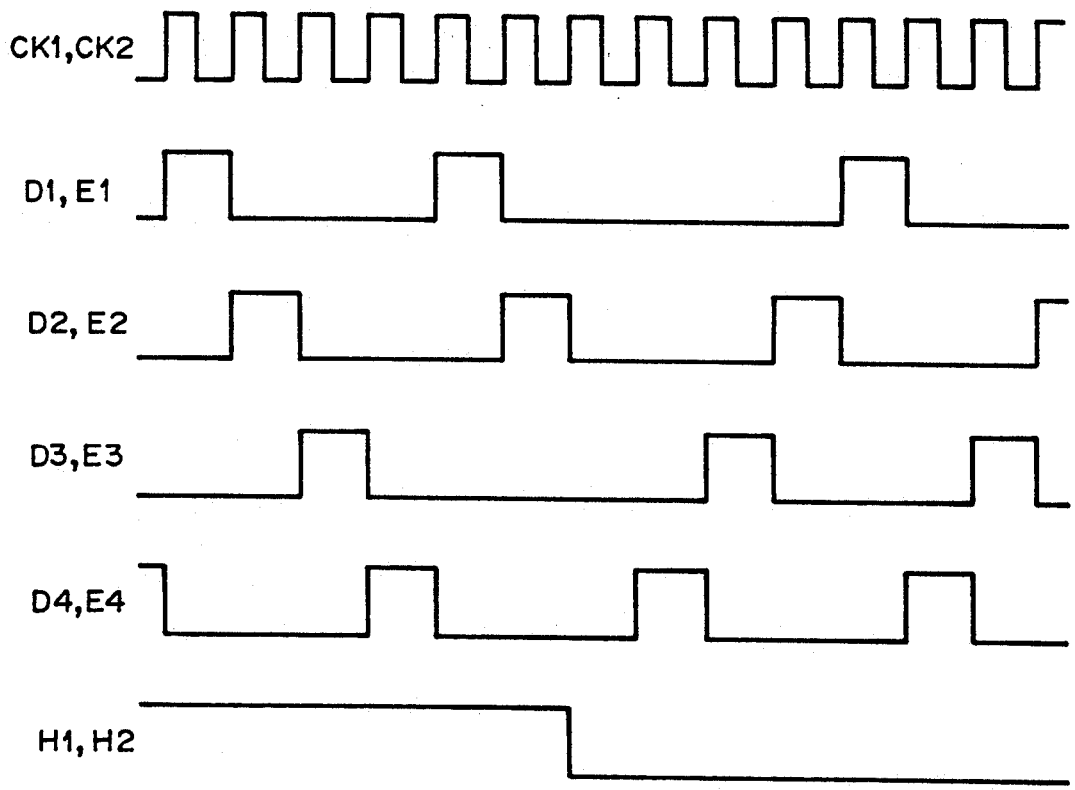
FIG. 6 is a timing chart showing the function of a ring counter.

Known ring counters 29, 30 of four-phase output vary the output as shown in FIG. 6 according to direction command signals from a CPU 53, and initiate a counting operation from an initial state after a predetermined time, when inputs $H_1$, $H_2$ vary. The four-phase outputs of the ring counters 29, 30 turn on and off the four switching elements in each of the switching element arrays 27, 28, thereby generating voltages to be supplied to the piezoelectric elements for driving the elastic member 1 or 2 and 3.

Figure 3:
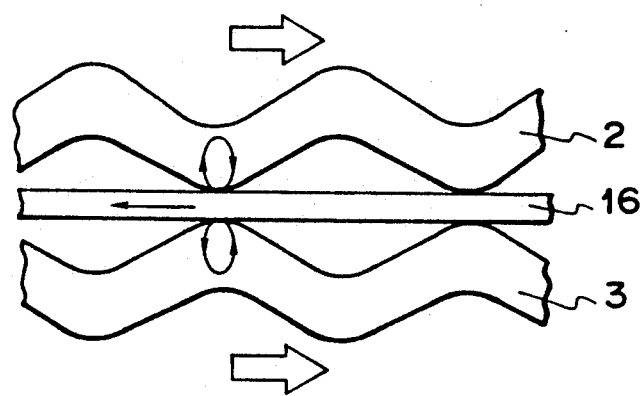
FIG. 3 is a schematic view showing the principle of sheet feeding.

For example, in the case of sheet feeding with the elastic members 2, 3, the ring counters 29, 30 supply the A-phase electrodes $2a$, $3a$ and the B-phase electrodes $2b$, $3b$ with AC voltages of a mutual phase difference of 90° in time. Since the elastic members 2 and 3 are mutually opposed, the counting direction is inverted by an inverter 55 whereby the travelling waves are formed and proceed as shown in FIG. 3. Also, the proceeding direction of the travelling waves can be altered by varying the inputs $H_1$, $H_2$, thereby varying the phases of the AC voltages supplied to the A-phase electrodes $2a$, $3a$ and the B-phase electrodes $2b$, $3b$.

More specifically, when the counter 29 releases outputs in the order of $D_1$, $D_2$, $D_3$, $D_4$ with the timings shown in FIG. 6, the switching elements in the array 27 are turned on in succession in the order of $S_1$, $S_2$, $S_3$, $S_4$, whereby the output of the circuit 31 flows in the primary coils of the transformers 23, 24 in the order of $S_1$, $S_2$, $S_3$, $S_4$. Consequently the secondary coils of the transformers 23, 24 generate cyclic voltages with a mutual phase difference of 90°, which are respectively supplied to the A-phase electrodes and the B-phase electrodes. Also, as the counters 29 and 30 receive mutually inverted direction command signals, when the counter 29 counts in the order $D_1$, $D_2$, $D_3$, $D_4$ as mentioned above, the counter 30 effects a counting operation in the order of $E_4$, $E_3$, $E_2$, $E_1$ so that the cyclic voltages generated in the transformers 25, 26 are different in phase from those generated in the transformers 23, 24. Consequently the travelling waves as shown in FIG. 3 are generated in the elastic members 2 and 3.

AC/DC converters 35, 36 are provided for detecting the amplitude of the output signals of the S-phase electrodes, and the amplitude detected therein are respectively compared with amplitude command signals supplied to (+)-input ports of comparators 40, 41. The difference signals thus obtained are integrated and amplified by low-pass filters 33, 34, then power amplified by power amplifiers 31, 32 and transmitted to the primary sides of the transformers 23, 24, 25, 26. If the amplitude of the elastic member is smaller than the amplitude command, the input signal to the low-pass filter 33 or 34 becomes positive to gradually increase the output thereof. Thus, the amplitude of the primary signal to the transformer increases to increase the voltages applied to the A- and B-phase electrodes of the piezoelectric element, whereby the amplitude of vibration of the elastic member is increased and adjusted to a value indicated by the amplitude command.

Figure 4:
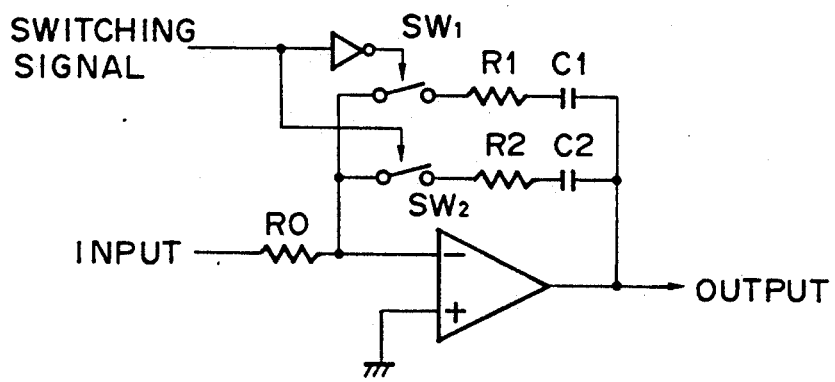
FIG. 4 is a circuit diagram of a low pass filter with switchable gain.

The low-pass filter 34 has a structure shown in FIG. 4, in which a switch SW2 or SW1 is closed respectively when a switching signal from the CPU 53 is high or low, thereby selecting a resistor R2 and a capacitor C2 or R1 and C1, thus switching the frequency characteristics or gain.

When switches 38, 39, 43 are in a state shown in FIG. 1, a switcher 37 connects the terminals a, b, c, d, e respectively to the terminals a', b', c', d', e' of the elastic member 2. On the other hand, when the switches 38, 39, 43 are shifted to a state opposite to that shown in FIG. 1 by a switching signal from the CPU 53, the switcher 37 connects the terminals a, b, c, d, e respectively to the terminals a", b", c", d", e" of the elastic member 1.

A frequency controller 42 adjusts the frequencies of output pulses CK1, CK2 thereof in order to control the ring counters 29, 30 in such a manner that a predetermined phase difference is obtained between the cyclic voltage supplied to the B-phase electrode and the output signal detected from the S-phase electrode. The frequency controller 42 interrupts the output for a predetermined period when the direction command signal from the CPU 53 is switched. The switches 38, 43 serve to select the frequency control for the elastic member 1 or 3. The switch 38 connects the output signal of the S-phase electrode of the elastic member 1 or 3 to the frequency controller 42, while the switch 43 connects the signal supplied to the elastic member 1 or 3 to the frequency controller 42. The switch 39 selects either the amplitude control for the elastic member 2 based on an amplitude command signal for position control to be explained later, or the amplitude control for the elastic member 1 based on an amplitude command signal for speed control to be explained later.

There are also provided a phase comparator 45 for PLL speed control, and an oscillator 46 for generating speed command pulses. A signal from the linear encoder 5 is compared in the phase comparator 45 with the speed command pulses from the oscillator 45, and the obtained output signal is supplied, through a low-pass filter 44 for noise elimination, as the amplitude command signal for speed control to the switch 39. A position control CPU 47 compares a stop position command signal with the count of a counter 52 for position detection by counting the output pulses of the rotary encoder 6, and generates the amplitude command signal for position control according to the difference. A CPU 53 generates the stop position command signal, the speed command signal and the elastic member switching signal according to the timing of printing and of sheet feeding, and also detects the position of the printing head (not shown) by counting the output pulses of the linear encoder 5 by a counter 54, and supplies the print data, supplied for example from an external computer, to the printing head at a predetermined print timing.

Matching elements 48, 49, 50, 51 are composed of capacitors or inductances, for matching electrostatic capacitance of the piezoelectric element with the secondary inductance of the transformer.

Figure 5:
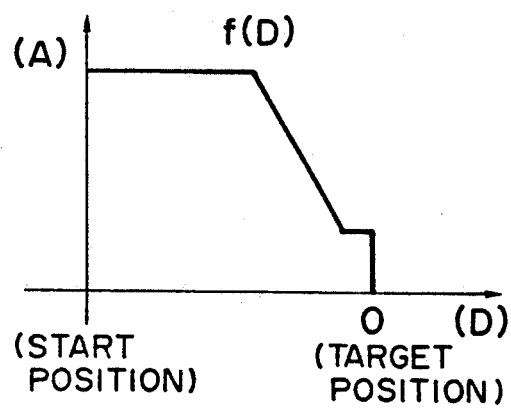
FIG. 5 is a chart showing the relation between the positional aberration and the amplitude command at the position control.
Figure 7:
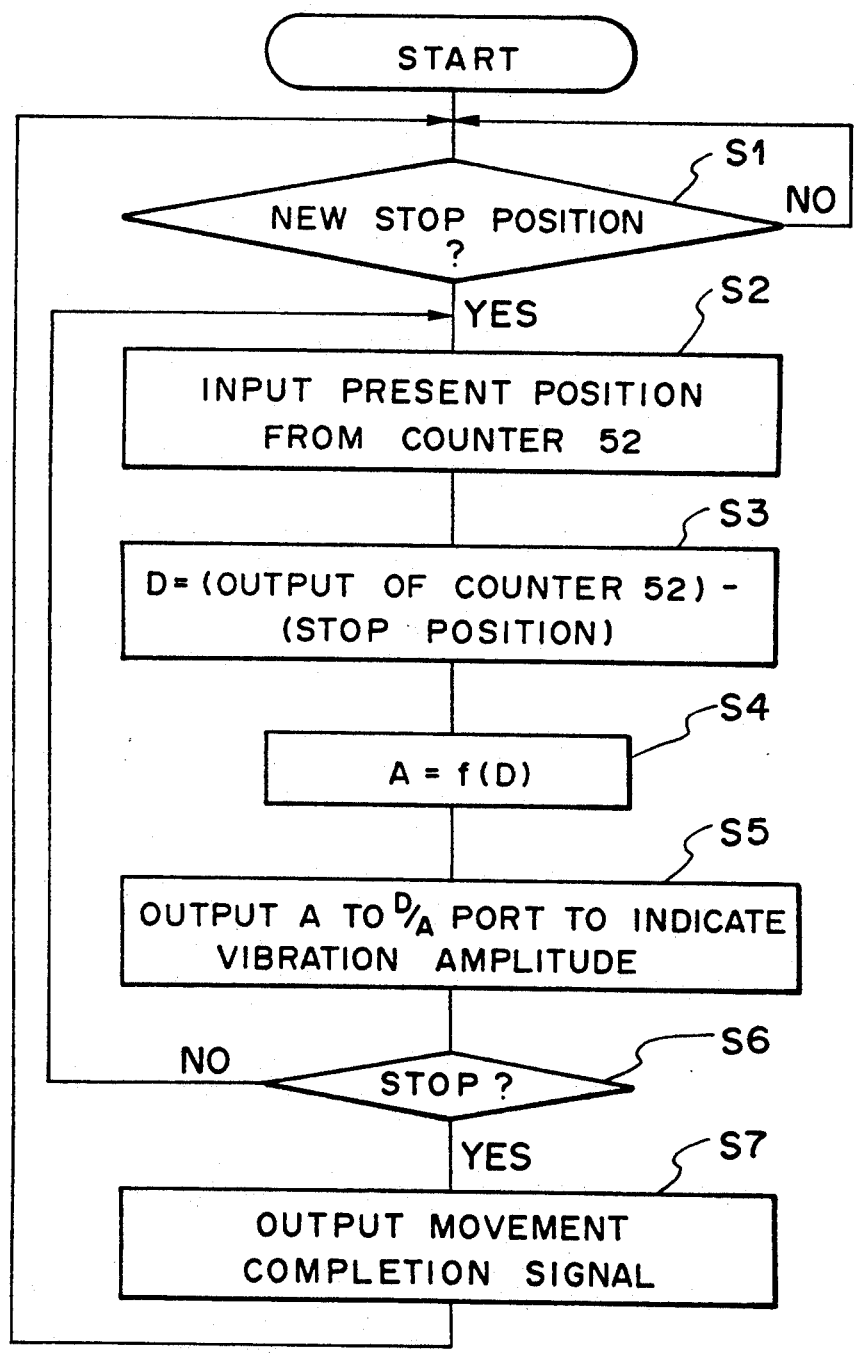
FIG. 7 is a flow chart showing the function of a CPU 47.

In the following there will be briefly explained the function of the CPU's 47, 53. FIG. 5 shows an example of the relationship between the difference (D) of the stop position command signal of the CPU 47 and of the output of the counter 52, and the amplitude command (A) for position control, and FIG. 7 is a flow chart of the control sequence of the CPU 47 used therefor. This control stops the vibration at the stop position or at a position slightly in front thereof.

It is assumed that the elastic member switching signal is in the low level state. In this state the switches 38, 39, 43 assume the illustrated position, and the switcher 37 connects the terminals a, b, c, d, e respectively with the terminals a', b', c', d', e'.

In this state, a step S1 in FIG. 7 discriminates whether a stop position command signals has been entered from the CPU 53, and, if not, the sequence remains at step S1.

When the stop position command signal is entered from the CPU 53, the sequence proceeds to a step S2 for fetching the count of the counter 52, which has counted the signals from the rotary encoder 6 and represents the current position of the sheet. Then a step S3 subtracts the stop position command signal from the count, then a step S4 determines the amplitude data A from the relationship shown in FIG. 5, and a step S5 releases the data A from the CPU 47. The data A is supplied to the comparators 40, 41, which also receive signals from the S-phase electrodes of the elastic members 3, 4, representing the amplitude thereof. Thus, the comparators 40, 41 release respective difference signals corresponding to the differences between the data A and the output signals from the S-phase signals, and the difference signals are supplied to the transformers 23, 24, 25, 26 through the circuits 33, 31, 34, 32. As will be apparent from the structure of the switching element array shown in FIG. 9, the transformers are given currents corresponding to the difference signals, whereby the elastic members 2, 3 are driven to advance the sheet. Subsequently, a step S6 discriminates whether the drive has been completed, and, if not, the sequence returns to the step S2 to repeat the above-explained sequence. In the course of the above-explained sequence, if the step S3 identifies D=0, indicating that the sheet has been advanced to the stop position, the step S4 also releases zero data A, whereby the comparators 40, 41 release zero outputs. Consequently, the transformers 23, 24, 25, 26 are deactivated, and the elastic members 2, 3 are no longer driven. The step S6 detects such state, and the sequence proceeds to a step S7 to terminate the sequence.

Figure 8:
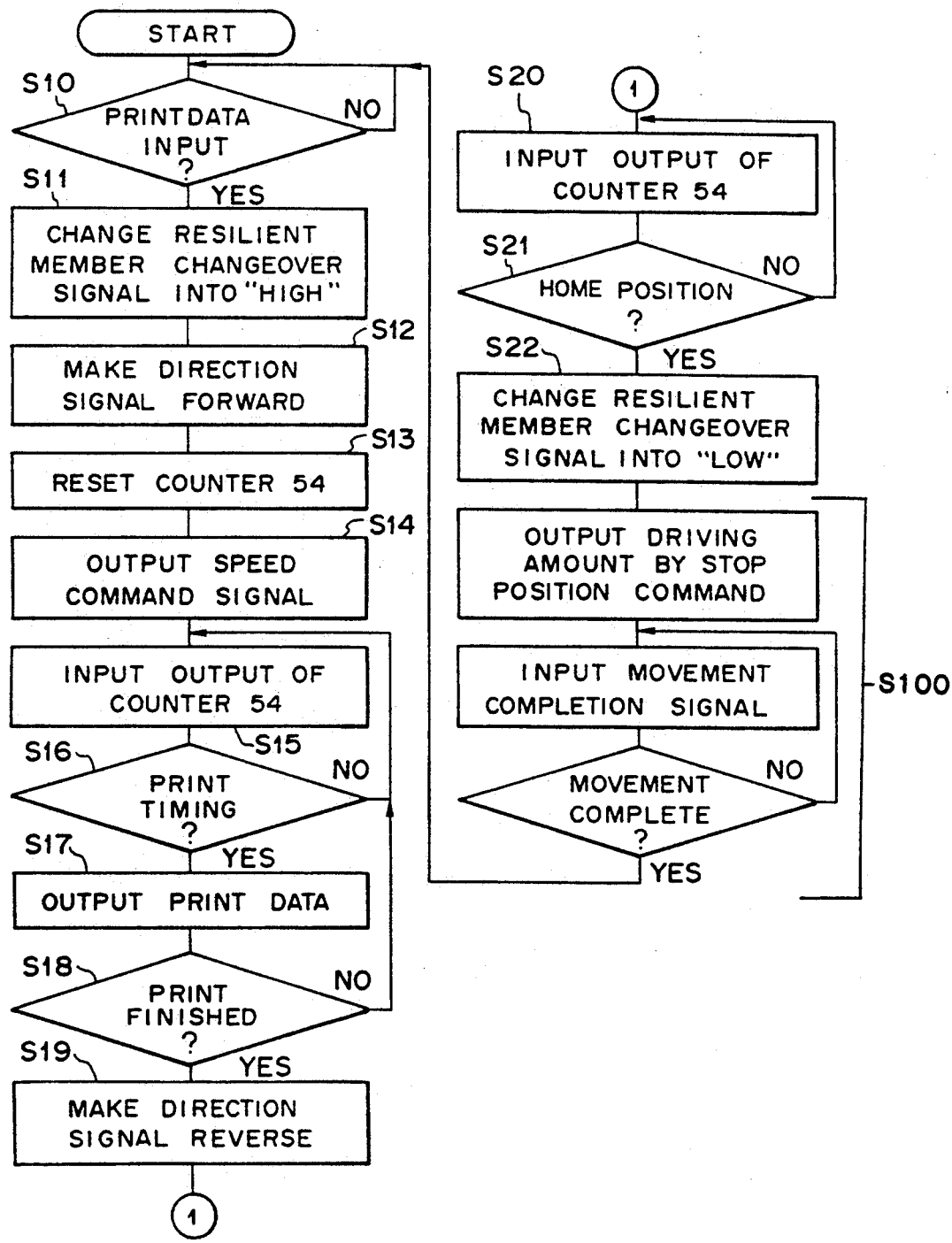
FIG. 8 is a flow chart showing the function of a CPU 53.

FIG. 8 is a flow chart of the control sequence of the CPU 53. When print data are supplied for example from an unrepresented computer, the sequence proceeds from the step S10 to S11 in which the CPU 53 shifts the elastic member switching signal to the high level state to shift the switches 38, 39, 43 to a state opposite to the illustrated state, whereby the switcher 37 connects the terminals a, b, c, d, e respectively to the terminals a", b", c", d", e". Then a step S12 sends the direction command signal instructing the forward counting to the ring counter 30; Then a step S13 resets the counter 54, and a step S14 releases a speed command signal. The oscillator 46 oscillates at a frequency corresponding to the speed command signal, and the comparator 45 effects phase comparison with the pulses from the encoder 5. The output of the comparator 45 is supplied, through the circuit 44, to the comparator 41, of which output is supplied to the primary side of the transformers 25, 26. Thus, the elastic member 1 is driven with a speed instructed by the speed command signal.

On the other hand, a step S15 counts the pulses from the linear encoder 5 and calculates the print timing, and steps S16, S17 send print data to the printing head such as a bubble printing head. After the printing of a line is identified in a step S18, a step S19 sends a direction command signal indicating a reverse direction to the ring counter 30, thereby returning the carriage 15 to the home position. After return to the home position is confirmed by steps S20, S21 from the output of the counter 54, a step S22 shifts the elastic member switching signal to the low level state, thereby shifting the switches 38, 39, 43 to the illustrated state and causing the switcher 37 to connect the terminals a, b, c, d, e respectively with the terminals a', b', c', d', e'. Then a stop position command signal is sent to the CPU 47 to effect the sequence, explained in relation to FIG. 7, in a routine S100. In such structure three elastic members can be driven with two drive circuits, so that the entire circuitry can be made more inexpensively.

Also, efficient drive of two different elastic members 1, 2 with the same transformer can be achieved by attaching a matching element to each elastic member, and further by selecting the same capacity for the voltage-dividing capacitors 17, 19, for example with an amplitude-voltage converting coefficient of 2 [V|μ] (indicating an output of 2 V per an amplitude of 1 μm), and by selecting the voltage-dividing capacitor 21 in such a manner that the amplitude-voltage converting coefficients by the capacitors 17, 19 assume the same value, or an integral multiple, or a multiple $2^m$ (wherein m is an integer) or a multiple 1/m. Also, selection of such coefficients of a same value, or a relationship of an integral multiple or a multiple $2^m$ (m being an integer) simplifies the structure of the control circuits (comparators 40, 41, low-pass filters 33, 34 etc.) when they are composed of digital circuits. Though the foregoing embodiment has been applied to a linear drive, it is similarly applicable to a rotary drive. A similar matching element is required also in a vibration type motor driven with standing waves. Also, in the foregoing embodiment the speed or position is controlled by the applied voltage, but low-pass filters and similar gain switching circuit are naturally required also in case of frequency control of the applied voltages.

As explained in the foregoing, the present embodiment reduces the cost as plural elastic members can be driven with a single drive circuit. Also, the use of a matching element for matching the transformer with each elastic member improves the efficiency of the circuit and to prevents the destruction of the switching element. Furthermore, the control circuit can be digitized in a simple manner, by selecting the voltage-dividing capacitors attached to the piezoelectric elements for detecting the vibration status of the elastic members, in such a manner that the amplitude-voltage converting coefficients of the capacitors are mutually equal, or satisfy a relation of an integral multiple, or a multiple of $2^m$ (m being an integer) or of 1/m.

What is claimed is:

1. A control device for controlling plural vibration type motors, said device comprising:
   a drive circuit having a periodic signal forming circuit for supplying electromechanical energy transducer elements, provided on respective vibration members constituting said vibration type motors, with periodic signals of different phases thereby driving said motors, and a state detecting unit for effecting drive state control of said motors by receiving monitor signals from said motors;
   a selection circuit for selecting at least one of said motors and for transmitting a monitor signal from said at least one selected motor to said state detecting unit of said drive circuit, thereby using said state detecting unit commonly for said selected motors; and
   a switching circuit for switching the control gain of said state detecting unit according to the motor selected by said selection circuit.

2. A control device according to claim 1, wherein said state detecting unit comprises a filter circuit, and wherein said switching circuit is adapted to switch frequency characteristics according to said at lease one selected motor.

3. A control device according to claim 1, wherein, in each of said vibration type motors, a vibration detecting element provided on the respective vibration member is adapted to generate said monitor signal, and is provided with a voltage-dividing capacitor and a discharging resistor.

4. A control device according to claim 3, wherein the voltage-dividing capacitors for said vibration type motors are selected so that amplitude-voltage converting coefficients of said capacitors are equal, or satisfy a relationship of an integral multiple, a multiple of $2^n$ (n being an integer), or 1/n.

5. A control device for controlling plural vibration type motors, said device comprising:
   a drive circuit having a periodic signal forming circuit for supplying electromechanical energy transducer elements, provided on respective vibration members constituting said vibration type motors, with cyclic signals of different phases thereby driving said motors, and a state detecting unit for effecting drive state control of said motors by receiving monitor signals from vibration detecting elements provided on said vibration members of said motors;
   a selection circuit for selecting at least one of said motors and for transmitting a monitor signal from said at least one selected motor to said state detecting unit of said drive circuit, thereby using said state detecting unit commonly for said at least one selected motors; and
   a voltage-dividing capacitor and a discharging resistor provided on the respective vibration detecting element of each said motor, wherein said voltage-dividing capacitors are selected so that amplitude-voltage converting coefficients thereof are equal or satisfy a relation of an integral multiple, a multiple of $2^n$ (n being an integer), or 1/n.

6. A printer apparatus utilizing plural vibration type motors in each of which periodic signals are applied to electrochemical energy transducer elements provided on a vibration member thereof, thereby generating a vibration therein and thus obtaining a driving force, said apparatus comprising:
   first and second vibration type motors for sheet feeding, with respective vibration generating units provided in mutually opposed positions;
   a third vibration type motor for moving a printing head; and
   a control circuit including a first drive circuit for selecting the first or third vibration type motor and for supplying the selected motor with periodic signals, and a second drive circuit for supplying the second vibration type motor with periodic signals.

7. A printer apparatus utilizing plural vibration actuators in each of which periodic signals are applied to electromechanical energy transducer elements thereof, thereby generating a vibration therein and thus obtaining a driving force, said apparatus comprising:
   a first vibration type actuator for sheet feeding;
   a second vibration type actuator for moving a printing head; and
   a control circuit including a first drive circuit for selecting the first or second vibration type actuator and for supplying the selected actuator with periodic signals, said circuit alternately selecting on a timesharing basis said first and second actuators to reciprocally perform sheet feeding and head moving operations.

8. A printer apparatus utilizing plural vibration actuators in each of which periodic signals are applied to electromechanical energy transducer elements thereof, thereby generating a vibration therein and thus obtaining a driving force, said apparatus comprising:

first and second vibration type actuators for sheet feeding;

a third vibration type actuator for moving a printing head; and a control circuit including a first drive circuit for selecting the first or third vibration type actuator and for supplying the selected actuator with periodic signals, and a second drive circuit for supplying the second vibration type actuator with periodic signals.

* * * * *

UNITED STATES PATENT AND TRADEMARK OFFICE
CERTIFICATE OF CORRECTION

PATENT NO. : 5,285,134
DATED : KENICHI KATAOKA
INVENTOR(S) : February 8, 1994

Page 1 of 2

It is certified that error appears in the above-indentified patent and that said Letters Patent is hereby corrected as shown below:

COLUMN 1
    Line 15, "devices" should read --devices,--.
    Line 20, "the" should be deleted.
    Line 59, "1B" should read --1B;--.

COLUMN 2
    Line 59, "faces piezoelec-" should read --faces. Piezoelec- --.
    Line 64, "guide" should read --a guide--, and "shown)" should read --shown),--.

COLUMN 3
    Line 18, "eliptic" should read --elliptic--.
    Line 19, "right." should read --the right.--.
    Line 45, "highspeed" should read --high-speed--.

COLUMN 4
    Line 49, "amplitude" should read --amplitudes--.

COLUMN 5
    Line 35, "oscillator 45," should read --oscillator 46,--.

COLUMN 6
    Line 4, "signals" should read --signal--.
    Line 49, "30;" should read --30.--.

COLUMN 7
    Line 15, "2[VI$\mu$]" should read 2[VI$\mu$m]--.
    Line 40, "to" should be deleted.
    Line 47, "or" should read --of--.

UNITED STATES PATENT AND TRADEMARK OFFICE
CERTIFICATE OF CORRECTION

PATENT NO. : 5,285,134
DATED : KENICHI KATAOKA
INVENTOR(S) : February 8, 1994

It is certified that error appears in the above-indentified patent and that said Letters Patent is hereby corrected as shown below:

COLUMN 8
    Line 35, "motors;" should read --motor;--.
    Line 45, "electrochemical" should read --electromechanical--.

Signed and Sealed this

Ninth Day of August, 1994

Attest:

BRUCE LEHMAN

Attesting Officer     Commissioner of Patents and Trademarks